United States Patent
Ljung

(10) Patent No.: US 10,039,141 B2
(45) Date of Patent: Jul. 31, 2018

(54) EVENT-TRIGGERED MODE SWITCHING FOR A MOBILE TERMINAL

(71) Applicant: Sony Corporation, Tokyo (JP)

(72) Inventor: Rickard Ljung, Helsingborg (SE)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 14/661,275

(22) Filed: Mar. 18, 2015

(65) Prior Publication Data

US 2016/0278159 A1    Sep. 22, 2016

(51) Int. Cl.
| | |
|---|---|
| H04M 3/00 | (2006.01) |
| H04W 76/04 | (2009.01) |
| H04W 76/27 | (2018.01) |
| H04W 52/02 | (2009.01) |
| H04W 4/70 | (2018.01) |
| H04W 88/06 | (2009.01) |

(52) U.S. Cl.
CPC ........... *H04W 76/046* (2013.01); *H04W 4/70* (2018.02); *H04W 52/0277* (2013.01); *H04W 76/27* (2018.02); *H04W 88/06* (2013.01); *Y02D 70/00* (2018.01); *Y02D 70/1226* (2018.01); *Y02D 70/1242* (2018.01); *Y02D 70/1262* (2018.01); *Y02D 70/142* (2018.01); *Y02D 70/21* (2018.01); *Y02D 70/24* (2018.01)

(58) Field of Classification Search
None
See application file for complete search history.

(56) References Cited

U.S. PATENT DOCUMENTS

| | | | |
|---|---|---|---|
| 2006/0293067 A1 | 12/2006 | Leung et al. | |
| 2008/0318535 A1* | 12/2008 | Black | H04W 52/0277 455/127.5 |
| 2010/0022212 A1* | 1/2010 | Lindoff | H04B 1/406 455/232.1 |
| 2010/0234017 A1* | 9/2010 | Lim | H04L 12/2807 455/426.1 |
| 2010/0235667 A1 | 9/2010 | Mucignat et al. | |
| 2010/0323753 A1* | 12/2010 | Imamura | H04B 7/0689 455/552.1 |

(Continued)

FOREIGN PATENT DOCUMENTS

| | | |
|---|---|---|
| EP | 2 271 154 | 1/2011 |
| WO | 2014/177184 A1 | 11/2014 |

OTHER PUBLICATIONS

International Search Report and Written Opinion for corresponding International Application No. PCT/EP2015/055617 dated Nov. 12, 2015.

(Continued)

*Primary Examiner* — Moustapha Diaby
(74) *Attorney, Agent, or Firm* — Renner Otto Boisselle and Sklar

(57) ABSTRACT

A mobile terminal comprises a modem for communication with a wireless network. The modem is configured for operating in a plurality of different modes. The mobile terminal comprises a processing device operative to, in response to detecting a trigger event, perform a mode selection to select a mode from the plurality of modes in accordance with at least one constraint, and control the modem to start operating in the selected mode.

20 Claims, 4 Drawing Sheets

(56) References Cited

U.S. PATENT DOCUMENTS

| | | | |
|---|---|---|---|
| 2011/0281583 A1* | 11/2011 | Hole | H04W 36/0055 455/436 |
| 2012/0020393 A1 | 1/2012 | Patil et al. | |
| 2012/0135709 A1* | 5/2012 | Deng | H04W 36/0016 455/411 |
| 2012/0190361 A1 | 7/2012 | Shaikh et al. | 455/4.34 |
| 2012/0207070 A1 | 8/2012 | Xu et al. | |
| 2012/0214494 A1* | 8/2012 | Awoniyi | H04W 88/10 455/439 |
| 2013/0210415 A1 | 8/2013 | Mathias et al. | 455/418 |
| 2013/0265974 A1 | 10/2013 | Van Phan et al. | 370/329 |
| 2014/0044030 A1* | 2/2014 | Ramachandran | H04W 52/0235 370/311 |
| 2014/0129672 A1* | 5/2014 | Singh | H04W 72/0446 709/217 |
| 2015/0071148 A1* | 3/2015 | Komatsu | H04W 8/22 370/311 |

OTHER PUBLICATIONS

3GPP TS 25.331 V12.4.0 (Dec. 2014) entitled "3rd Generation Partnership Project; Technical Specification Group Radio Access Network; Radio Resource Control (RRC); Protocol specification (Release 12)".

3GPP TS 36.331 V12.4.1 (Dec. 2014) entitled "3rd Generation Partnership Project; Technical Specification Group Radio Access Network; Evolved Universal Terrestrial Radio Access (E-UTRA); Radio Resource Control (RRC); Pro-tocol specification (Release 12)".

* cited by examiner

EVENT-TRIGGERED MODE SWITCHING FOR A MOBILE TERMINAL

FIELD OF THE INVENTION

Embodiments of the invention relate to wireless communication. Embodiments of the invention relate in particular to a mobile terminal configured for communication with a wireless network, a system and methods performed by such devices in which an operation mode of a modem of the mobile terminal is controlled.

BACKGROUND OF THE INVENTION

With increasing popularity of mobile voice and data communication, there is an ever increasing demand for high-speed data communication. Modern mobile terminals of a wireless network, e.g. smartphones, have advanced processing capabilities. The mobile terminals can run a wide variety of applications. These applications include social networks, e-mail services, update clients such as news update centers or weather forecasts, without being limited thereto.

Some of these applications continue to operate even when the mobile terminal is not in use. Some of these applications may continue to operate continuously or quasi-continuously even when a screen of the mobile terminal is switched off. In this case, the application(s) may continue to transmit or receive data via a modem of the mobile terminal. This causes the processor(s) of the mobile terminal which execute the application(s) to run for extended time periods. Moreover, also the modem is switched on repeatedly to allow the application(s) to transmit or receive data. This reduces battery lifetime while providing only limited benefit to the user when the mobile terminal is not in use.

To reduce modem power consumption, the mobile terminal may be set to different states. For illustration, 3GPP specification TS 25.331 V12.4.0 (2014-12) entitled "3rd Generation Partnership Project; Technical Specification Group Radio Access Network; Radio Resource Control (RRC); Protocol specification (Release 12)" defines different RRC states in section 7.1. The mobile terminal may enter some of these states autonomously, e.g. when a timer expires. However, the pre-defined transitions between different states may limit the versatility of controlling modem operation.

To control modem operation modes, which may have different power consumption, a dedicated signalling may be implemented in which the mobile terminal requests a wireless network to allow the mobile terminal to use another operation mode for the modem. Such techniques provide the wireless network with control over the usage of reduced power modes by the mobile terminals, but increase network loads.

BRIEF SUMMARY OF THE INVENTION

There is a continued need in the art for devices and methods which mitigate the problems associated with conventional techniques of controlling modem operation modes of a mobile terminal. There is in particular a need for devices and methods which do not require dedicated signalling in order for the mobile terminal to change its modem operation mode.

According to embodiments, an event-triggered switching of a mode of operation for a modem of a mobile terminal is introduced. The event-triggered switching may include a mode selection in which the mode is selected from a plurality of mode in accordance with at least on constraint. The selection of a mode from a plurality of modes provides enhanced versatility compared to pre-defined, fixed transitions between operating states, while respecting one or several constraints which may be either static or network-configured, so that they are known to the wireless network. By implementing the mode switching as an event-triggered procedure, no dedicated signalling is required for the mobile terminal to change the mode in which the modem operates.

Use of the constraints enhanced network control over the modes which may be used by the mobile terminal even when there is no dedicated signalling involved. For illustration, use of certain modes may be selectively allowed or may be selectively prohibited by the at least one constraint, in dependence on user equipment (UE) category, modem usage, or other parameters associated with the mobile terminal.

A mobile terminal according to an embodiment comprises a modem for communication with a wireless network, the modem being configured for operating in a plurality of different modes. The mobile terminal comprises a processing device operative to, in response to detecting a trigger event, perform a mode selection to select a mode from the plurality of modes in accordance with at least one constraint, and control the modem to start operating in the selected mode.

Each constraint of the at least one constraint may be either static or configured by the wireless network. This ensures that the network has a significant control over mode changes even when there is no dedicated signalling for each mode switching.

The mobile terminal may be operative to receive signalling defining a constraint of the at least one constraint from the wireless network.

The signalling may comprise Radio Resource Control, RRC, signalling. The RRC signalling may comprise layer 1, layer 2, and/or layer 3 signalling.

The constraint may be a cell-specific constraint set by the wireless network.

A further constraint of the at least one constraint may be static. The further constraint may be stored in the mobile terminal.

The processing device may be operative to identify a subset of the plurality of modes based on the constraint and at least one parameter associated with the mobile terminal. Thereby, the ones of the plurality of modes which are in conformity with all constraints to be complied with may be identified. A mode may be selected from the subset, e.g. based on a power consumption minimization criterion.

The at least one parameter may comprise information on applications executed by the mobile terminal, the mode selection being performed to reduce data transfers to the mobile terminal while the applications are executed by the mobile terminal. The trigger event may be that a screen of the mobile terminal is switched off, thereby reducing data transfers while the screen is off, even when the applications continue to be executed.

The at least one parameter taken into consideration in the mode selection may comprise a user equipment (UE) category assigned to the mobile terminal.

The at least one parameter taken into consideration in the mode selection may additionally or alternatively comprise a machine-type communication capability of the mobile terminal.

The at least one parameter taken into consideration in the mode selection may additionally or alternatively comprise a rate at which the mobile terminal requests data transmissions to be performed from the mobile terminal to the wireless network and/or from the wireless network to the mobile terminal.

The at least one parameter taken into consideration in the mode selection may additionally or alternatively comprise an amount of data transmitted by the mobile terminal per time.

Different modes may give rise to different modem power consumptions. Thereby, power consumption problems may be mitigated when the screen of the mobile terminal is switched off, for example.

At least one mode of the plurality of modes may be configured such that the mobile terminal, while operating in this mode, makes transitions between different RRC states.

The processing device may be operative to select a machine-type communication, MTC, mode from the plurality of modes in the mode selection and to control the mobile terminal to start operating in the MTC mode if the at least one constraint permits the MTC mode to be selected. Efficient power reduction may be attained thereby.

The MTC mode may be a Long Term Evolution (LTE)-MTC mode.

The modem may make transitions between a reduced power consumption state and an active state while the mobile terminal operates in the MTC mode.

The selected mode may be distinguished from at least one further mode in power consumption.

Additionally or alternatively, the selected mode may be distinguished from at least one further mode by at least one of modulation format, maximum output power, frequency hopping rate, and transmission repetition count.

The mobile terminal may be user equipment. The user equipment may be configured for communication with a Long Term Evolution (LTE) network. The mobile terminal may be a mobile phone, e.g. a smart phone.

The mobile terminal may be a machine-to-machine (M2M) terminal. The mobile terminal may be operative to perform M2M communication via the wireless network.

A system according to an embodiment comprises a cellular wireless network comprising a plurality of base stations. The system comprises a mobile terminal according to an embodiment configured for communication with the plurality of base stations.

A node of the cellular wireless network may be operative to configure a constraint of the at least one constraint used by the mobile terminal in the mode selection.

According to an embodiment, a method of controlling a mobile terminal is provided. The mobile terminal comprises a modem for communication with a wireless network, the modem being configured for operating in a plurality of different modes. The method comprises performing, by a processing device of the mobile terminal, a mode selection to select a mode from the plurality of modes in accordance with at least one constraint in response to detecting a trigger event. The method comprises controlling the modem to start operating in the selected mode.

The method may be performed by the mobile terminal according to any embodiment.

In the method, each constraint of the at least one constraint may be either static or configured by the wireless network. This ensures that the network has a significant control over mode changes even when there is no dedicated signalling for each mode switching.

The method may comprise receiving, by the mobile terminal, signalling defining a constraint of the at least one constraint from the wireless network.

The signalling may comprise Radio Resource Control, RRC, signalling. The RRC signalling may comprise layer 1, layer 2, and/or layer 3 signalling.

The method may comprise setting the constraint by the wireless network in a cell-specific manner.

A further constraint of the at least one constraint may be static. The further constraint may be stored in the mobile terminal.

Performing the mode selection may comprise identifying a subset of the plurality of modes based on the constraint and at least one parameter associated with the mobile terminal. Thereby, the ones of the plurality of modes which are in conformity with all constraints to be complied with may be identified. A mode may be selected from the subset, e.g. based on a power consumption minimization criterion.

In the method, the at least one parameter may comprise information on applications executed by the mobile terminal, the mode selection being performed to reduce data transfers to the mobile terminal while the applications are executed by the mobile terminal. The trigger event may be that a screen of the mobile terminal is switched off, thereby reducing data transfers while the screen is off, even when the applications continue to be executed.

In the method, the at least one parameter taken into consideration in the mode selection may comprise a user equipment (UE) category assigned to the mobile terminal.

In the method, the at least one parameter taken into consideration in the mode selection may additionally or alternatively comprise a machine-type communication capability of the mobile terminal.

In the method, the at least one parameter taken into consideration in the mode selection may additionally or alternatively comprise a rate at which the mobile terminal requests data transmissions to be performed from the mobile terminal to the wireless network and/or from the wireless network to the mobile terminal.

In the method, the at least one parameter taken into consideration in the mode selection may additionally or alternatively comprise an amount of data transmitted by the mobile terminal per time.

In the method, different modes may give rise to different modem power consumptions. Thereby, power consumption problems may be mitigated when the screen of the mobile terminal is switched off, for example.

In the method, at least one mode of the plurality of modes may be configured such that the mobile terminal, while operating in this mode, makes transitions between different RRC states.

Performing the mode selection may comprise selecting a machine-type communication, MTC, mode from the plurality of modes in the mode selection and controlling the mobile terminal to start operating in the MTC mode if the at least one constraint permits the MTC mode to be selected. Efficient power reduction may be attained thereby.

In the method, the MTC mode may be a Long Term Evolution (LTE)-MTC mode.

In the method, the modem may make transitions between a reduced power consumption state and an active state while the mobile terminal operates in the MTC mode.

In the method, the selected mode may be distinguished from at least one further mode in power consumption.

In the method, the selected mode may additionally or alternatively be distinguished from at least one further mode by at least one of modulation format, maximum output power, frequency hopping rate, and transmission repetition count.

In the method, the mobile terminal may be user equipment. The user equipment may be configured for communication with a Long Term Evolution (LTE) network. The mobile terminal may be a mobile phone, e.g. a smart phone.

In the method, the mobile terminal may be a machine-to-machine (M2M) terminal. The mobile terminal may be operative to perform M2M communication via the wireless network.

In the mobile terminals, systems and methods according to embodiments, the mode of operation of the modem may be switched in response to the trigger event, without any signalling being performed to perform the mode switch.

Devices, systems and methods according to embodiments allow a mobile terminal to initiate a transition to a mode having lower power consumption than the regular, fully operative mode, for example, without increasing network loads. The wireless network can still exercise control on the modes which are respectively selected by using constraints which are static and thus known to the wireless network or which may be configured by the wireless network.

BRIEF DESCRIPTION OF THE DRAWINGS

Embodiments of the invention will be described with reference to the accompanying drawings in which the same or similar reference numerals designate the same or similar elements.

DESCRIPTION OF EMBODIMENTS

Exemplary embodiments of the invention will be described with reference to the drawings. While some embodiments will be described in the context of specific fields of application, e.g. in the context of exemplary radio access technologies, the embodiments are not limited to this field of application. The features of the various embodiments may be combined with each other unless specifically stated otherwise.

Figure 1:
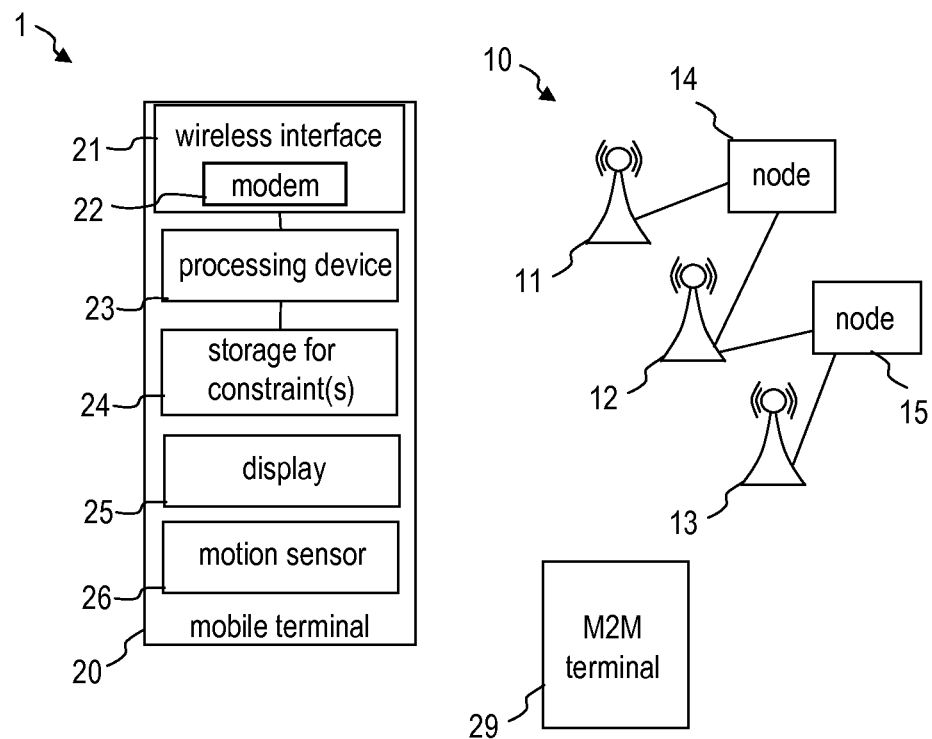
FIG. 1 is a schematic view of a system according to an embodiment.

FIG. 1 is a schematic view of a communication system 1 according to an embodiment. The communication system 1 comprises a mobile terminal 20. The communication system 1 comprises a wireless network 10. The wireless network 10 has a radio access network (RAN).

The wireless network 10 may be a cellular network. The radio access network includes a plurality of base stations 11-13. The base stations 11-13 may be operatively coupled to other nodes 14, 15 which may be provided in the radio access network or in a core network (CN) of the wireless network 10. The specific configuration of the wireless network 10, of the base stations 11-13 and of the nodes 14, 15 depends on the communication standard. For illustration, the wireless network 10 may be a Global System for Mobile Communications (GSM) network. In this case, the RAN is a GSM EDGE Radio Access Network (GERAN), with the nodes 14, 15 being base station controllers. The wireless network 10 may be a Universal Mobile Telecommunications System (UMTS) network. In this case, the RAN is a UMTS Terrestrial Radio Access Network (UTRAN), with the base stations 11-13 respectively being a NodeB and the nodes 14, 15 being a Radio Network Controller (RNC). The wireless network 10 may be a Long Term Evolution (LTE) network. In this case, the RAN is an evolved UTRAN (eUTRAN), with the base stations 11-13 respectively being an evolved Node B (eNodeB), and the nodes 14, 15 being a Mobility Management Entity (MME) and/or Serving Gateway (S-GW) in the core network.

The mobile terminal 20 has a wireless interface 21 or several wireless interfaces 21 to communication with at least one radio access network (RAN). The wireless interface(s) 21 comprises a modem 22. The modem 22 performs the modulation and demodulation, respectively, required for the respective communication standard used by the mobile terminal 20.

The mobile terminal 20 may be configured for communication with the RAN according to the Radio Resource Control, RRC, protocol. For illustration, the mobile terminal 20 may be operative to communicate with the RAN in accordance with 3GPP specification TS 25.331. The mobile terminal 20 may be configured for radio communication with the RAN in accordance with 3GPP specification TS 25.331 V12.4.0 (2014-12) entitled "3rd Generation Partnership Project; Technical Specification Group Radio Access Network; Radio Resource Control (RRC); Protocol specification (Release 12)". Alternatively or additionally, the mobile terminal 20 may be operative to communicate with the RAN in accordance with 3GPP specification TS 36.331. The mobile terminal 20 may be configured for radio communication with the RAN in accordance with 3GPP specification TS 36.331 V12.4.1 (2014-12) entitled "3rd Generation Partnership Project; Technical Specification Group Radio Access Network; Evolved Universal Terrestrial Radio Access (E-UTRA); Radio Resource Control (RRC); Protocol specification (Release 12)".

The modem 22 is configured for operating in accordance with a plurality of different modes. The modes may be distinguished from each other in their power consumption. Alternatively or additionally, the modes may be distinguished from each other in that protocol features are selectively activated or deactivated. For illustration, one of the modes may be a machine-type communication (MTC) mode according to long term evolution (LTE). At least one other mode may be a mode which is not an MTC mode.

In at least some of the modes, the usage of the modem 22 for processing data transfers or other messages received by the mobile terminal 20 may be limited to reduce the power consumption. These modes which provide lower power consumption of the modem are also referred to as power save modes herein, or simply as modes having lower power consumption than a regular, fully operative mode.

In at least some of the modes, the usage of the modem 22 for processing data to be transmitted by the mobile terminal 20 and/or for processing data transfers received by the mobile terminal 20 may be adjusted compared to a default mode of the modem 22. For illustration, the modem 22 may have a default mode and at least one further mode which uses a modulation scheme different from the modulation scheme of the default mode. Alternatively or additionally, the modem 22 may have a default mode and at least one further mode which uses a frequency hopping scheme different from the modulation scheme of the default mode. Alternatively or additionally, the modem 22 may have a default mode and at least one further mode which has a maximum output power different from that of the default mode. Alternatively or additionally, the modem 22 may have a default mode in which transmissions are repeated until a first transmission repeat count is reached, and at least one further mode in which transmissions are repeated until a second transmission repeat count is reached, the second transmission repeat count being different from the first transmission repeat count.

In several or in all of the modes, the mobile terminal 20 may be operative to make transitions between an idle state in which the mobile terminal 20 is in an RRC disconnected state and an RRC connected state. This distinguishes at least some of the modes from conventional discontinuous reception, DRX, states or from the URA_PCH state, the CELL_PCH state, the CELL_FACH state, and the CELL_DCH state. The mobile terminal 20 may have the states defined in 3GPP specification TS 25.331 V12.4.0 (2014-12) entitled "3rd Generation Partnership Project; Technical Specification Group Radio Access Network; Radio Resource Control (RRC); Protocol specification (Release 12)", sections 7.1 and 7.2, and may switch between the states while operating in a selected mode. The mobile terminal 20 may be in one of these states to receive signals while operating in one of the various modes which provide lower power consumption, but still remains operative to switch between the idle state and the RRC connected state while being in the respective mode. By contrast, the mobile terminal 20 is always in the RRC connected state when operating in the URA_PCH state, the CELL_PCH state, the CELL_FACH state, and the CELL_DCH state.

The mobile terminal 20 has a processing device 23 which controls operation of the mobile terminal 20. The processing device 23 may comprise one microprocessor or several microprocessors, one microcontroller or several microcontrollers, an application specific integrated circuit (ASIC) or a combination of such components. The processing device 23 may monitor whether a trigger event is detected and may perform a mode selection to determine which one of the several modes should be used. As will be described in more detail with reference to FIG. 2 to FIG. 8, one constraint or several constraints are taken into consideration in the mode selection performed by the processing device 23.

The mobile terminal 20 may comprise a storage device 24 in which one or several constraints are stored. Each one of the constraints may be either static or configured by the wireless network 10. This ensures that the wireless network 10 can still exercise control on mode switching performed by mobile terminal 24, because it is aware of the constraint(s) used by the mobile terminal 20 when the constraint(s) are static and because it can configure the constraint(s) which are not static.

The constraint(s) may define which mode(s) may be selected as a function of one or several parameters of the mobile terminal 20. The one or several parameters may vary as a function of time, as may be the case for UE category.

The constraint(s) may prevent the mobile terminal 20 from selecting a mode depending on the condition of the mobile terminal 20. For illustration, use of certain modes may be restricted to UE category. Modes which are not consistent with the present UE category, e.g. UE category 0 or UE category 1, may not be selected.

Use of certain modes may be restricted depending on the mobile terminal capabilities. For illustration, the mobile terminal 20 may be permitted to use an MTC mode or at least certain power save functionalities of MTC only if the mobile terminal 20 is capable of supporting half duplex.

Use of certain modes may be restricted depending on the mobile terminal data transmission. For illustration, if the mobile terminal 20 requests data transmissions more frequently than a first rate threshold, use of an MTC mode or of another power save mode may be prevented. For further illustration, if the mobile terminal 20 transmits more data per time than a data threshold, use of an MTC mode or of another power save mode may be prevented. For further illustration, if the mobile terminal 20 has not transmitted data for a pre-defined time threshold, it shall be forced to enter an MTC mode or another power save mode.

Use of certain modes may be restricted depending on Access Points (APs) which the mobile terminal 20 attempts to access. For illustration, if the mobile terminal 20 tries to connect to a WLAN AP, use of an MTC mode or of another power save mode may be prevented.

The processing device 23 may also execute applications. At least one application or several of the applications may continue to be executed even when the mobile terminal 20 has entered a standby mode, for example. Examples for such applications include social networks, e-mail services, update clients such as news update centres or weather forecasts, without being limited thereto. The application(s) would normally transmit data over the wireless interface 21 to the wireless network 10 and would receive data from the wireless network 10.

The mode selection performed based on the constraints may also take into account which applications are executed on the mobile terminal 20. For illustration, when an e-mail application is being executed by the mobile terminal 20, the constraints may force the processing device 23 to select a mode which allows data to be transferred to the mobile terminal 20 more frequently than if only a news update service or weather forecast application are executed. The processing device 23 may predict which data traffic will be required in dependence on the applications which are executed on the mobile terminal 20 and may perform the mode selection based on both the at least one constraint and the predicted data traffic which depends on the application(s) which are being executed by the mobile terminal 20.

The processing device 23 may monitor a trigger event to perform a mode selection. For illustration, the trigger event may comprise that a display 25 of the mobile term final 23 is switched off. The trigger event may be that the display 25 has been switched off for at least a pre-defined time interval.

Additionally or alternatively, the trigger event may depend on whether the mobile terminal 20 has been moved around. The trigger event may be that an output signal of a motion sensor 26 indicates that the mobile terminal 20 was not moved for at least a pre-defined time interval.

Additionally or alternatively, the trigger event may depend on battery status. The trigger event may be that the remaining energy stored in the battery reaches or falls below a battery level threshold.

Additionally or alternatively, the trigger event may be that a rate at which the mobile terminal 20 requests data transmissions towards the mobile terminal 20 reaches or falls below a data transmission rate threshold.

Additionally or alternatively, the trigger event may be that a total data amount received by the mobile terminal 20 per time falls below a data amount threshold.

The threshold(s) which may be used in detecting the trigger event and/or when determining which modes are allowed in accordance with the mobile terminal conditions, may respectively either be static or configured by the wireless network.

One or several of these criteria may be combined. For illustration, the pre-defined time interval for which the display 25 was switched off and/or for which the mobile terminal 20 was not moved in space may be set by the processing device 23 in dependence on the battery status.

By performing a trigger-event selection of modes in which the modem 22 operates, the network loads associated with a mode switching may be reduced because no dedicated signalling is required for each mode switch. In particular, the mobile terminal 20 may be configured such that it does not request the wireless network 10 to permit a mode switch after detection of the trigger event and prior to performing the mode selection and starting operation in the new mode.

By using one or several constraints to select mode(s) which are allowed, the mode selection may still be implemented in a versatile manner and may take into account a variety of different configurations and/or operating conditions of the mobile terminal 20. When each one of the constraints is respectively either static or configured by the wireless network 10, the wireless network 10 still can exercise control over the mode switching performed by the mobile terminal 20. For illustration, for mode switching which depends on UE category, control over permissible mode switches may be attained by controlling the UE category. Alternatively or additionally, one or several constraints may be set by the wireless network 10 so as to ensure that only mobile terminals 20 which have low data communication needs enter an MTC mode or another mode having reduced power consumption.

A selection of a mode which depends on the data traffic predicted based on the at least one application executed by the processing device 23 allows the application(s) to remain operative while reducing power.

The mobile terminal 20 may have various configurations. For illustration, the mobile terminal 20 may be a portable phone, e.g. a smart phone. The mobile terminal 20 may communicate with a machine-to-machine (M2M) terminal 29 through the wireless network 10 even when the mobile terminal 20 operates in a MTC mode or uses certain protocol features of the MTC mode.

The number of defined modes may depend on the specific configuration of the mobile terminal 20. This allows the physical layer behaviour to be optimized with a view to different M2M use cases, smartphones in different modes, non-voice centric devices, or similar.

Figure 2:
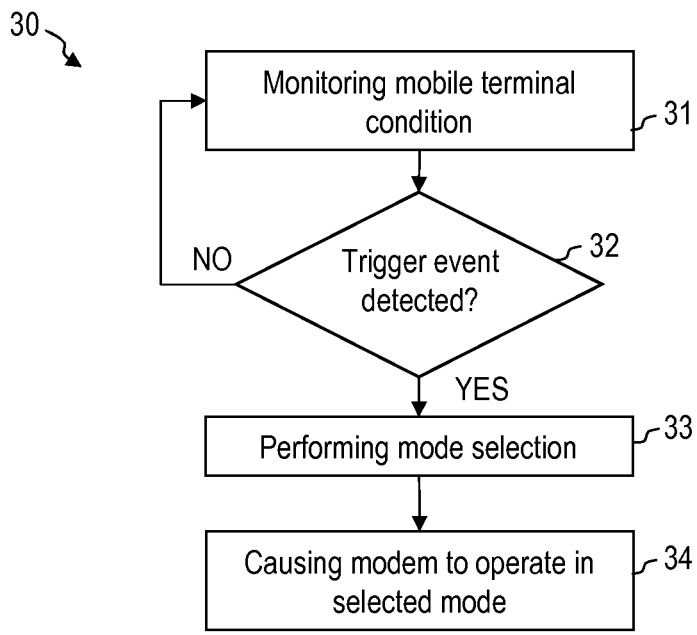
FIG. 2 is a flow chart of a method according to an embodiment.

FIG. 2 is a flow chart of a method 30 according to an embodiment. The method 30 may be performed by the processing device 23 of the mobile terminal 20.

At 31, the processing device monitors a condition of the mobile terminal. Monitoring the condition may include monitoring a duration for which the display 25 has been switched off. Monitoring the condition may include monitoring a time period for which the mobile terminal 20 was not moved, as indicated by an output signal of a motion sensor 26. Monitoring the condition may include monitoring applications which are executed on the mobile terminal 20.

At 32, it is determined whether a trigger event is detected. The trigger event may depend on a threshold comparison of a time for which the display 25 was switched off, on a threshold comparison of a time for which the mobile terminal 20 was not moved, on a threshold comparison of a the rate at which the mobile terminal 20 requests data transmissions to be performed to the mobile terminal 20, and/or on a threshold comparison of data amounts transmitted or received by the mobile terminal 20. Other criteria may be used. For illustration, a battery level may also trigger the mode selection. If the trigger event is not detected, the method returns to 31. Otherwise, the method proceeds to 33.

At 33, a mode selection is performed by the processing device 23. The mode selection is performed based on one or several constraints. Each one of the one or several constraints may respectively be either static or configured by the wireless network 10.

The mode selection may have a variety of different formats, as was explained with reference to FIG. 1 and as will be explained in further detail with reference to FIG. 3 to FIG. 8.

At 34, the processing device 23 causes the modem to start operating in the selected mode. The change in mode effected at 34 may cause the mobile terminal to change at least one of a frequency hopping scheme (e.g. the pattern in which frequency hopping is performed in a subband), maximum output power, power consumption, or available bandwidth.

In the method, the mobile terminal 20 may be operative such that no signalling with the wireless network is performed in steps 32-34. The change in operation mode of the modem 22 may be performed autonomously by the mobile terminal 20 in an event-triggered manner, without performing any signalling with the wireless network 10 to implement the change in mode.

As one exemplary implementation of the trigger event, user inactivity may cause the mobile terminal 20 to perform the mode selection when the mobile terminal has not been in use for at least a pre-determined time period.

Figure 3:
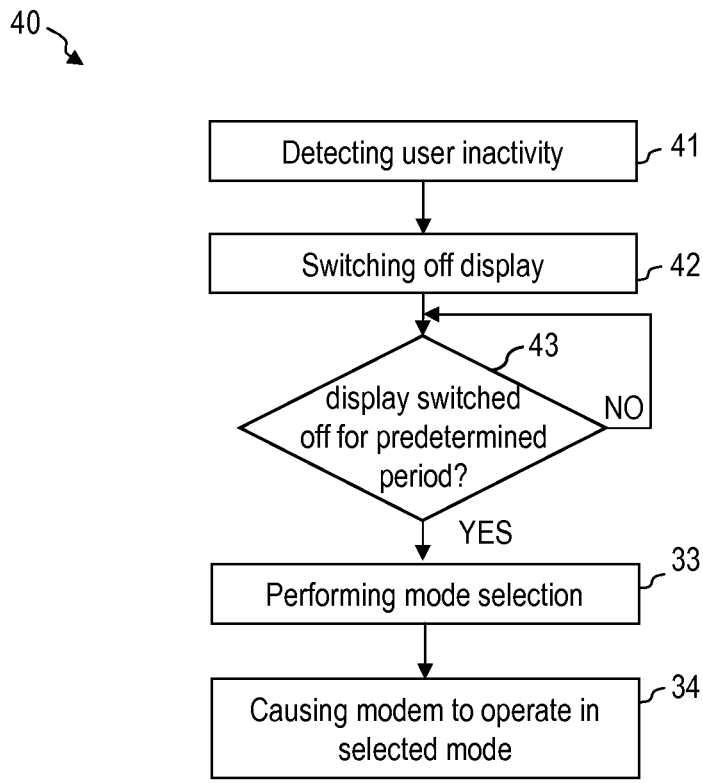
FIG. 3 is a flow chart of a method according to an embodiment.

FIG. 3 is a flow chart of a method 40 according to an embodiment.

At 41, user inactivity is detected. The user inactivity may be detected in response to an output signal of a motion sensor 26 indicating that the mobile terminal 20 was not displaced in an interval.

At 42, the display may be switched off.

At 43, in order to determine whether the trigger event occurs, the processing device 23 may determine whether the display has been switched off for a pre-determined time period. If the display has not been switched off for the pre-determined time period, the monitoring may be continued at 43, unless a user action brings the mobile terminal 20 back to the fully operative state.

At 33 and 34, if it is determined that the display has been switched off for the pre-determined time period, a mode selection may be performed and the modem may be caused to operate in accordance with the selected mode. Steps 33 and 34 may be implemented as described with reference to FIG. 2.

Figure 4:
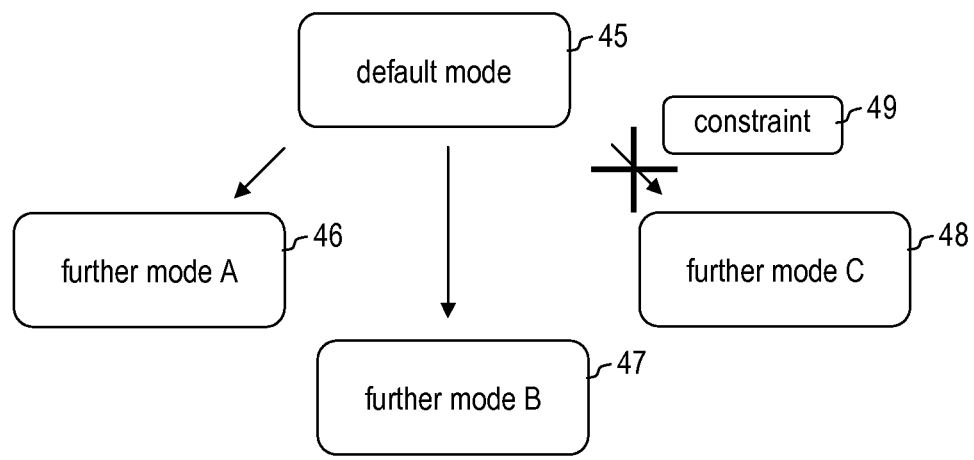
FIG. 4 is a diagram illustrating a mode selection in accordance with at least one constraint.

FIG. 4 is a diagram illustrating various modes 45-48 of the modem 22 of the mobile terminal 20. The modem 22 may have a default mode 45 which may correspond to a fully active of DRX mode, for example.

The modem 22 may have a plurality of further modes 46-48. At least one of the further modes 46-48 may be a MTC mode or may use protocol functions of the MTC mode to reduce power consumption. In one or several of the further modes 46-48, a modulation scheme may be different from a modulation scheme of the default mode 45. In one or several of the further modes 46-48, a frequency hopping scheme may be different from a frequency hopping scheme of the default mode 45. One or several of the further modes 46-48 may have a modem power consumption which, on average, is less than that of the default mode 45.

When performing the mode selection, the processing device 23 takes into account one or several constraints. The one or several constraints may be evaluated depend on mobile terminal conditions, such as the applications which are being executed by the mobile terminal 20, the past or predicted data traffic, or other conditions. Depending on the mobile terminal conditions, one or several of the further modes may not be permissible. For illustration, a MTC mode 48 or a mode 48 which uses protocol functions of MTC may not be allowed in view of a constraint 49 if the rate at which the mobile terminal 20 requests data transmissions to the mobile terminal 20 reaches or exceeds a rate threshold.

FIG. 4 is a signalling diagram for a system comprising the mobile terminal 20 and the base station 11 of the wireless network 10.

There may be RRC signalling 51 between the mobile terminal 20 and the base station 11. Such RRC signalling 51 may be used to configure one or several constraints which are taken into account when performing a mode selection.

In response to detecting a trigger event 52, the mobile terminal 20 performs a mode selection 53 and causes the modem to start operating according to the selected mode at 54. No signalling is required between the mobile terminal 20 and the base station 11 to implement this change in mode.

When each one of the constraint(s) used in the mode selection 53 is either static or configured by the wireless network, the wireless network may also adjust its settings for communication with the mobile terminal 20 when the mobile terminal 20 starts operating in the new selected mode. For illustration, when the constraints are all either static or configured by the wireless network 10 so as to ensure that only modes having a specific modulation scheme, frequency hopping scheme, or DRX cycle length may be selected by the mobile terminal 20, the wireless network 10 may adjust its configuration so as to ensure that the new mode of the mobile terminal may be accommodated in uplink and downlink communication.

Figure 5:
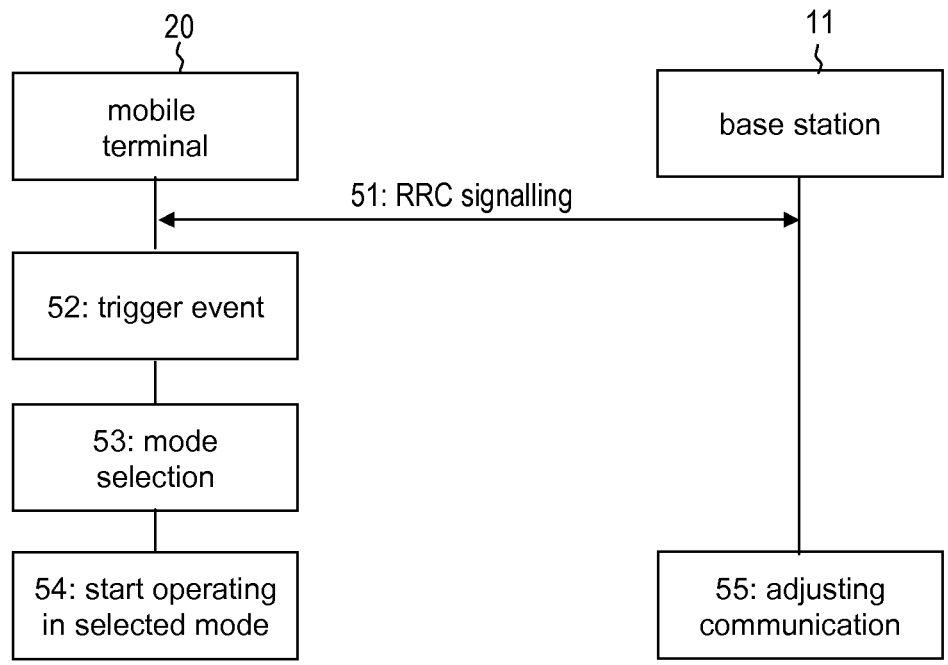
FIG. 5 is a diagram illustrating operation of a mobile terminal in a method according to an embodiment.

FIG. 5 is a signalling diagram for a system comprising the mobile terminal 20 and the base station 11 of the wireless network 10.

There may be RRC signalling 59 between the mobile terminal 20 and the base station 11 in which the wireless network 10 configure one or several constraints which are taken into account when performing a mode selection.

The wireless network 10 may be operative to configure at least one threshold used in a threshold comparison to determine which modes may be selected by the mobile terminal 20. For illustration, the wireless network 10 may be operative to configure a rate threshold which defines which mode(s) are not allowable when the rate at which the mobile terminal 20 requests data transmissions to the mobile terminal 20 exceeds the rate threshold. For illustration, use of an MTC mode or of a mode which uses MTC protocol functions may be prevented if the rate at which the mobile terminal 20 requests data transmissions to the mobile terminal 20 exceeds the rate threshold.

For further illustration, the wireless network 10 may be operative to configure a data amount threshold which defines which mode(s) are not allowable when the data amount transmitted to or from the mobile terminal 20 per time exceeds the data amount threshold. For illustration, use of an MTC mode or of a mode which uses MTC protocol functions may be prevented if the data amount transmitted to or from the mobile terminal 20 exceeds the data amount threshold.

Other techniques may be used for configuring the at least one constraint. For illustration, a system information block (SIB) may include information on at least some or all constraints which are applicable for mode selection.

Figure 6:
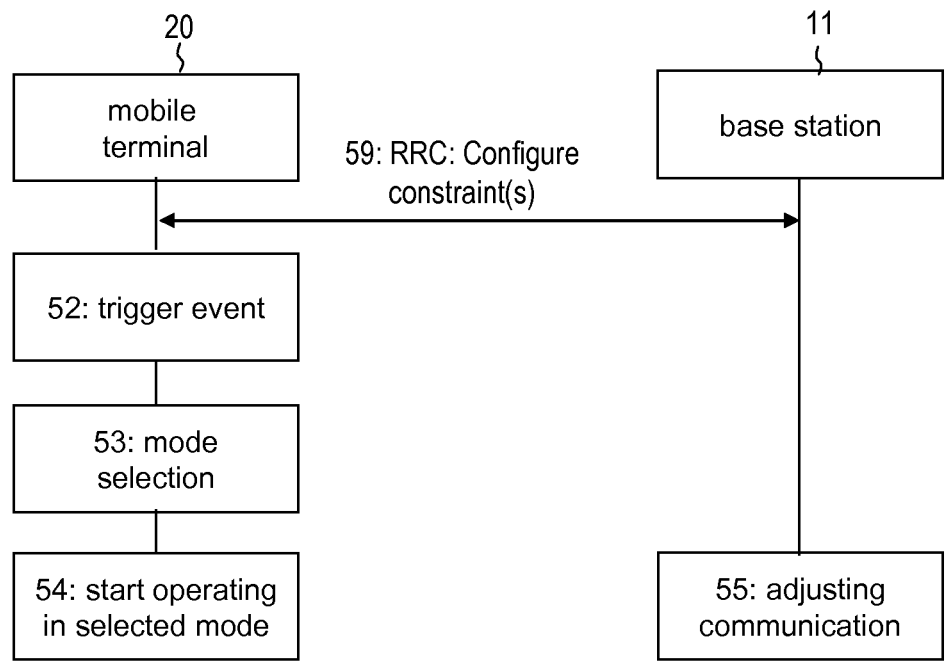
FIG. 6 is a diagram illustrating operation of a mobile terminal in a method according to an embodiment.

The constraint(s) may be used by the mobile terminal for mode selection as described with reference to FIG. 6. It is noted that, while constraint(s) are configured by the mobile terminal in FIG. 6, no dedicated signalling is required for implementing a mode switch.

The constraint(s) may be configured by the wireless network 10 in a cell-specific manner. The wireless network 10 may be operative to configure different constraint(s) for different cells. For illustration, a first set of constraints may be configured for mobile terminals camping on a first cell of the wireless network 10. A second set of constraints may be configured for mobile terminals camping on a second cell of the wireless network 10, the second set being different from the first set.

The wireless network 10 may be operative to configure the constraint(s) in a cell-specific manner in dependence on a number of mobile terminals camping on the respective cell, in dependence on interference reported for the respective cell, and/or in dependence on other parameters which may be monitored by the base stations 11-13 or which may be reported by the mobile terminals.

Figure 7:
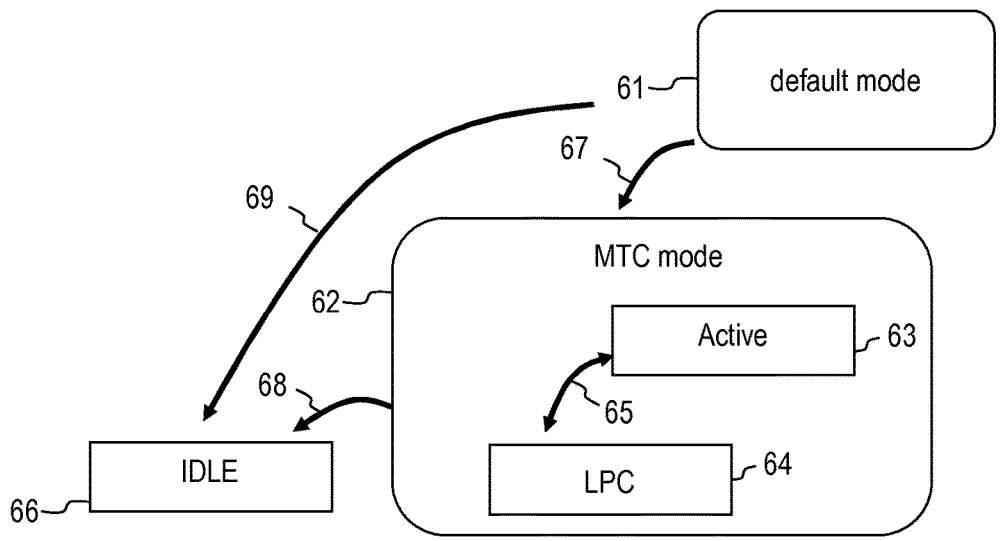
FIG. 7 is a diagram illustrating a mode selection in accordance with at least one constraint.

FIG. 7 schematically illustrates various modes of a mobile terminal 20 according to an embodiment.

An idle mode 66 may be a mode in which the mobile terminal 20 is RRC disconnected.

A default mode 61 may correspond to a mode in which the mobile terminal 20 remains in an RRC connected state or transitions between an RRC connected state and an idle state in DRX operation.

An MTC mode 62 may be a mode in which the mobile terminal 20 operates in accordance with LTE-MTC. Alternatively, a mode 62 in which at least some of the MTC-specific protocol features may be used by the mobile terminal 20 may be used.

While operating in the MTC mode 62, the mobile terminal 20 may make repeated transitions between an active state 63 in which it can receive and transmit data and a low power consumption (LPC) state 64 in which it cannot receive and transmit data.

Constraints may define which transitions between different modes may be made, in dependence on the condition of the mobile terminal such as applications that are being executed, ingoing and outgoing data traffic patterns, display state on or off, or other conditions. For illustration, depending on ingoing and outgoing data traffic patterns, the mobile terminal may make a transition from the default mode 61 to either the MTC mode 62 or the idle mode 66.

Figure 8:
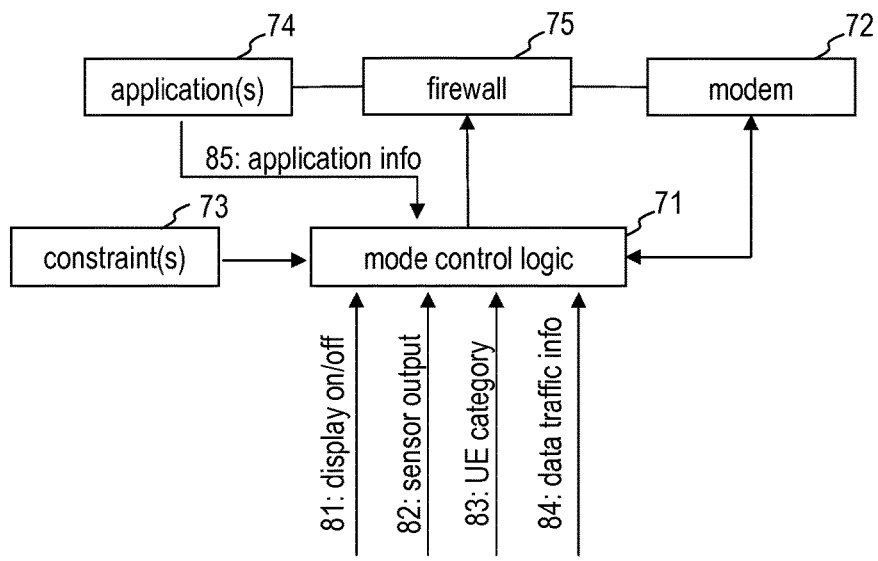
FIG. 8 is a block diagram representation of functional units of a mobile terminal according to an embodiment.

FIG. 8 is a functional block representation of a mobile terminal 20 according to an embodiment.

A mode control logic 71 may detect a trigger event and may perform a mode selection in accordance with at least one constraint. The mode control logic 71 may initiate the mode selection in dependence on a signal 81 indicating whether the display is switched on or off. Alternatively or additionally, the mode control logic 72 may initiate the mode selection in dependence on a signal 82 which is indicative of a motion of the mobile terminal. The signal 82 indicative of the motion may be an output signal of a motion sensor. Alternative or additional signals may be evaluated to determine that a mode selection is to be performed. For illustration, ingoing or outgoing data traffic amounts per time and/or a rate at which data transmissions are requested may be used as a trigger for performing the mode selection.

The mode control logic 71 may perform the mode selection based on conditions of the terminal and at least one constraint 73 stored in the mobile terminal 20. The at least one constraint 73 may be static or configured by the wireless network 10. Each one of several constraints 73 may either be static or configured by the wireless network 10.

The mode control logic 71 may use various pieces of information relating to mobile terminal usage to evaluate, based on the constraints, which mode(s) may be selected. The mode control logic 71 may identify modes which are in conformity with a UE category 83 of the mobile terminal 20 and the various constraints. For illustration, a MTC mode or a mode which uses protocol features specific to MTC may be available only for one specific UE category or for a set of specific UE categories, while being prohibited for other UE categories. The mode control logic 71 may additionally or alternatively identify modes which are in conformity with incoming or outgoing data traffic and the various constraints. The mode control logic 71 may use information 85 on applications which are being executed by the mobile terminal to predict future traffic demands or to determine based on past data traffic which modes are available in view of the constraints. For illustration, a MTC mode or a mode which uses protocol features specific to MTC may be available only if the total data amount per time is less than a data amount threshold and/or if the rate at which the mobile terminal 20 requests data transmissions is less than a rate threshold, while being prohibited for higher data amount or higher rates at which the mobile terminal requests transmissions.

When several modes are admissible for the mobile terminal, the mobile terminal may select the one of the modes which has the lowest modem power consumption, for example.

The mode control logic 71 may control the modem 72 in to start operating in the mode selected by the mode selection. Mode switching may comprise adapting the layer 1, layer 2, and/or layer 3 signalling between the mobile terminal and the wireless network. Mode switching may comprise adapting at least one of a frequency hopping pattern, a frequency hopping rate, a modulation scheme, a maximum output power or other parameters.

The mode control logic 71 may also selectively control a firewall 75. The firewall 75 may be operative to restrict or prevent an application or several applications 74 running on the mobile terminal 20 from transmitting data to the wireless network. The firewall 75 may limit modem usage by the application(s) for outgoing data transfers.

A wide variety of different constraints may be used to control the usage of one or several of the modes. The constraints may depend on other protocol functions such as UE category or half duplex capability of the mobile terminal 20.

For illustration, the constraint(s) may limit usage of certain mode(s) to specific UE categories.

The constraint(s) may limit usage of certain mode(s) to mobile terminal 20s having half duplex capability. For illustration, use of at least some protocol features specific to MTC may be allowed only for mobile terminal 20s having half duplex capability.

Different modes may have different limitations, which may be taken into account by the constraint(s).

For illustration, for a certain mode, the mobile terminal 20 may not be allowed to request data transmissions at a rate higher than a rate threshold. The constraint(s) may prevent the mobile terminal 20 from selecting such a mode if the monitored or predicted data transmission rate is higher than the rate threshold.

For further illustration, for a certain mode, the mobile terminal 20 may not be allowed to transmit a data amount per time which exceeds a data amount threshold. The constraint(s) may prevent the mobile terminal 20 from selecting such a mode if the monitored or predicted data traffic indicates that a data amount exceeding the data amount threshold is to be transmitted.

For further illustration, for a certain mode, the mobile terminal 20 may not be allowed to access certain APs or certain types of APs. The constraint(s) may prevent the mobile terminal 20 from selecting such a mode if the processing device 23 detects that the mobile terminal 20 currently connects to or previously tried to connect to such an AP or type of AP.

For further illustration, for a certain mode, there may be time limitations which specify that the mobile terminal shall enter this mode if the mobile terminal has not transmitted data for a certain time period. The constraint(s) may prevent the mobile terminal 20 from selecting such a mode if the processing device 23 detects that the mobile terminal 20 transmits data more frequently. The constraint(s) may force the mobile terminal 20 to select such a mode if the processing device 23 detects that the mobile terminal 20 did not transmit data for the time period.

Various threshold or other criteria applicable in the constraint(s) may be set by the wireless network 10. For illustration, thresholds defined by the constraints used in the mode selection may be set by the wireless network 10 to configure the constraints. This may be done in a network-specific or cell-specific manner. Dedicated signalling, such as RRC signalling, may be used to configure the constraints in a network-specific or cell-specific manner.

The various embodiments allow the mode switching of the mobile terminal 20 to be controlled by the wireless network 10 without requiring explicit signalling for each mode switch. The techniques may thereby be used by a plurality of mobile terminals in the same cell without significantly increasing the network loads associated with mode switch control signalling. This can be achieved while maintaining network control over the constraints which define when and how the mode switching occurs.

Various effects are attained by the devices and methods according to embodiments. For illustration, various embodiments of the invention allow the wireless network 10 to control mode switching of the mobile terminal 20 without requiring an explicit dedicated signalling to implement this mode switching. The mobile terminal can still switch between RRC connected and RRC disconnected states in the selected mode, while the parameters settings for layer 1, layer 2, and/or layer 3 signalling between the mobile terminal and the RAN may depend on the selected mode.

While exemplary embodiments have been described with reference to the drawings, modifications may be implemented in other embodiments. For illustration, the mobile terminal may be a mobile phone, a M2M terminal, or another mobile terminal. Further, while exemplary network technologies have been described, embodiments of the invention may be used in combination with other network technologies.

The operation of the various functional units may be implemented by hardware, by software, or a combination thereof. For illustration, the functions of the logic which selects a mode may be performed by a microprocessor or microcontroller which executes instructions programmed in a non-volatile memory.

The invention claimed is:

1. A mobile terminal, comprising:
a modem for communication with a wireless network, the modem being configured for operating in a plurality of different modem operation modes, wherein while in each one of the plurality of different modem operation modes the modem is operational; and
a processing device operative to,
monitor whether a trigger event is detected,
perform a mode selection to select a modem operation mode from the plurality of modem operation modes in accordance with at least one constraint in response to detecting a trigger event that is dependent on a condition of the mobile terminal, the at least one constraint defining which modem operation mode or which modem operation modes are allowed to be selected as a function of one or several parameters of the mobile terminal, said mode selection reducing loads placed on the wireless network, wherein the selected modem operation mode is distinguished from at least one further modem operation mode by a transmission repetition count associated with each respective modem operation mode, and
control the modem to start operating in the selected modem operation mode.

2. The mobile terminal of claim 1,
wherein each constraint of the at least one constraint is either static or configured by the wireless network.

3. The mobile terminal of claim 2,
wherein the mobile terminal is operative to receive signalling defining a constraint of the at least one constraint from the wireless network.

4. The mobile terminal of claim 3,
wherein the signalling comprises Radio Resource Control, RRC, signalling.

5. The mobile terminal of claim 3,
wherein the constraint defined by the signalling is a cell-specific constraint.

6. The mobile terminal of claim 1,
wherein a further constraint of the at least one constraint is statically stored in the mobile terminal.

7. The mobile terminal of claim 1,
wherein the processing device is operative to identify a subset of the plurality of modem operation modes based on the constraint and at least one parameter associated with the mobile terminal.

8. The mobile terminal of claim 7,
wherein the at least one parameter comprises information on applications executed by the mobile terminal, the mode selection being performed to reduce data transfers to the mobile terminal while the applications are executed by the mobile terminal.

9. The mobile terminal of claim 7,
wherein the at least one parameter comprises at least one of:
user equipment category,
machine-type communication capability,
rate at which the mobile terminal requests data transmissions, and
amount of data transmitted by the mobile terminal per time.

10. The mobile terminal of claim 1,
wherein the processing device is operative to select a machine-type communication, MTC, mode from the plurality of modem operation modes in the mode selection and to control the mobile terminal to start operating in the MTC mode if the at least one constraint permits the MTC mode to be selected.

11. The mobile terminal of claim 10,
wherein the modem makes transitions between a reduced power consumption state and an active state while the mobile terminal operates in the MTC mode.

12. The mobile terminal of claim 1,
wherein the selected modem operation mode is distinguished from at least one further modem operation mode by a power consumption and by at least one of:
modulation format,
maximum output power, and
frequency hopping rate.

13. A system, comprising
a cellular wireless network comprising a plurality of base stations; and
a mobile terminal comprising:
a modem for communication with the cellular wireless network, the modem being configured for operating in a plurality of different modem operation modes, wherein while in each one of the plurality of different modem operation modes the modem is operational; and
a processing device operative to monitor whether a trigger event is detected, perform a mode selection to select a modem operation mode from the plurality of modem operation modes in accordance with at least one constraint in response to detecting a trigger event that is dependent on a condition of the mobile terminal, the at least one constraint defining which modem operation mode or which modem operation modes are allowed to be selected as a function of one or several parameters of the mobile terminal, said mode selection reducing loads placed on the wireless network, wherein the selected modem operation mode is distinguished from at least one further modem operation mode by a transmission repetition count associated with each respective modem operation mode, and control the modem to start operating in the selected modem operation mode.

14. A method of controlling a mobile terminal, the mobile terminal comprising a modem for communication with a wireless network, the modem being configured for operating in a plurality of different modem operation modes, wherein while in each one of the plurality of different modem operation modes the modem is operational, the method comprising:
monitoring, by a processing device of the mobile terminal, whether a trigger event is detected,
performing, by the processing device of the mobile terminal, a mode selection to select a modem operation mode from the plurality of modem operation modes in accordance with at least one constraint in response to detecting a trigger event that is dependent on a condition of the mobile terminal, the at least one constraint defining which modem operation mode or which modem operation modes are allowed to be selected as a function of one or several parameters of the mobile terminal, said mode selection reducing loads placed on the wireless network, wherein the selected modem operation mode is distinguished from at least one further modem operation mode by a transmission repetition count associated with each respective modem operation mode; and
controlling, by the processing device, the modem to start operating in the selected modem operation mode.

15. The method of claim 14,
wherein each constraint of the at least one constraint is either static or configured by the wireless network.

16. The mobile terminal of claim 15, further comprising:
receiving, by the modem, signalling from the wireless network defining a constraint of the at least one constraint.

17. The method of claim 14,
wherein performing the mode selection comprises:
   identifying a subset of the plurality of modem operation modes based on the at least one constraint and at least one parameter associated with the mobile terminal.

18. The method of claim 17,
wherein the at least one parameter comprises at least one of:
   user equipment category,
   machine-type communication capability,
   rate at which the mobile terminal requests data transmissions, and
   amount of data transmitted by the mobile terminal per time.

19. The method of claim 14,
wherein performing the mode selection comprises:
   selecting a machine-type communication, MTC, mode from the plurality of modem operation modes; and
wherein controlling the modem comprises:
   controlling the modem to start operating in the MTC mode if the at least one constraint permits the MTC mode to be selected.

20. The method of claim of claim 14,
wherein the selected modem operation mode is distinguished from at least one further mode by a power consumption and by at least one of:
   modulation format,
   maximum output power,
   frequency hopping rate, and
   transmission repetition count.

\* \* \* \* \*